(12) United States Patent
Swaggart

(10) Patent No.: US 9,020,335 B2
(45) Date of Patent: Apr. 28, 2015

(54) CAMERA HOLD FAST ACCESSORY CLIP

(71) Applicant: Matthew Swaggart, Tulsa, OK (US)

(72) Inventor: Matthew Swaggart, Tulsa, OK (US)

( * ) Notice: Subject to any disclaimer, the term of this patent is extended or adjusted under 35 U.S.C. 154(b) by 0 days.

(21) Appl. No.: 13/941,998

(22) Filed: Jul. 15, 2013

(65) Prior Publication Data

US 2015/0016813 A1    Jan. 15, 2015

(51) Int. Cl.
*G03B 17/56* (2006.01)
*A44B 11/02* (2006.01)

(52) U.S. Cl.
CPC .............. *G03B 17/566* (2013.01); *A44B 11/02* (2013.01); *Y10T 24/4745* (2015.01)

(58) Field of Classification Search
CPC .................................................... G03B 17/566
USPC ................................................ 396/155, 423
See application file for complete search history.

(56) References Cited

U.S. PATENT DOCUMENTS

| | | | |
|---|---|---|---|
| 4,328,917 A | | 5/1982 | Reeberg |
| 5,239,728 A | * | 8/1993 | Redman .......................... 16/244 |
| 5,738,328 A | * | 4/1998 | O'Farrill ........................ 248/500 |
| 6,113,088 A | * | 9/2000 | Gakhar et al. ................. 269/139 |
| 6,189,845 B1 | * | 2/2001 | Chen ........................... 248/177.1 |
| 8,047,729 B2 | * | 11/2011 | Kope et al. ..................... 396/423 |
| 8,678,679 B2 | * | 3/2014 | Xu ................................. 396/423 |
| 2013/0101280 A1 | * | 4/2013 | Xu ................................. 396/423 |

OTHER PUBLICATIONS

Loctite® Threadlocker Blue 242®, Nut and Bolt Locker, product webage, 2 pages, www.loctiteproducts.com, Feb. 4, 2013.

* cited by examiner

*Primary Examiner* — Christopher Mahoney
*Assistant Examiner* — Linda B Smith
(74) *Attorney, Agent, or Firm* — Charles D. Gunter, Jr.

(57) ABSTRACT

An accessory clip is shown which can be used to provide an attachment point for an associated strap for carrying an object by the strap. The accessory clip has a base with an inner planar surface and an outer planar surface separated by a thickness which forms a sidewall for the clip. A bail element is attached to the sidewall and can move relative to the clip base. A carrying strap can be attached to the bail element. The accessory clip has a threaded shaft which extends outwardly from the base inner planar surface. The threaded shaft has a thru bore provided therein which transverses the threaded shaft at a generally right angle thereto, the thru bore being filled with a resilient plastic material which protrudes slightly at either of two opposite ends of the thru bore. The resilient plastic material helps to secure the threaded shaft within a mating threaded receptacle of an object to be carried.

6 Claims, 1 Drawing Sheet

U.S. Patent    Apr. 28, 2015    US 9,020,335 B2

CAMERA HOLD FAST ACCESSORY CLIP

BACKGROUND OF THE INVENTION

1. Field of the Invention

The present invention relates generally to locking screw devices and, more particularly, a relatively simple camera accessory clip which securely mounts in a tripod mount of a camera base by means of a locking screw, the clip being used to facilitate carrying and use of cameras.

2. Description of the Prior Art

There are many situations in which is would be desirable to provide an accessory clip of the screw-in type which could be used with various types of consumer goods which would remain securely locked in place in a mating screw receptacle until it became convenient to remove the clip.

To take one example, a wide variety of still photography and motion picture cameras are used at the present time in photographing and recording a virtually infinite range of scenes and events. In this regard, cameras are frequently carried by individuals having the intent to photograph various scenes and events on a planned or spontaneous basis. For this purpose, in the prior art, a wide range of camera carrying equipment has been proposed to facilitate carrying of a camera preferably in a manner safeguarding the camera against undesired damage, loss and theft. Common camera carrying devices include, for example, elongated straps designed to permit suspension of the camera from a persons neck, shoulder, etc. Other types of popular camera carriers include camera bags which typically include elongated shoulder straps and the like for easy portability.

Many of the presently available camera carrying devices of the above type have an attachment screw which is received within a mating screw receptacle provided on the base of the camera in the form of the camera tripod attachment receptacle. The attachment screw can have an associated attachment clip which can be used to secure the attachment strap. The strap may be worn around the user's neck, waist, wrist, etc.

One problem with these types of attachment schemes is that the attachment screw can work loose from the screw receptacle, thereby presenting the possibility that the camera might be dropped or lost. Many of today's digital SLR cameras cost thousands of dollars and dropping or losing the camera can be a very costly event for a photographer.

Accordingly, a need exists for an improved accessory clip of the screw-in type which could be used with a variety of consumer goods, and which will remain securely locked in place over time.

More particularly, a need exists for such an accessory clip, useful as a camera accessory clip which securely mounts in a tripod mount of a camera base by means of a locking screw, and which securely remains in place over time, protecting the camera against undesired loss or damage by insuring that the camera will not be dropped or lost.

The present invention fulfills these needs and provides other related advantages.

SUMMARY OF THE INVENTION

The hold fast accessory clip of the invention is an improved locking screw device which can be used in a variety of applications to secure a threaded shaft to a mating threaded receptacle to prevent the threads from inadvertently becoming disengaged. In one particularly preferred application, the hold fast accessory clip is securely mounted in a tripod mount of a camera base by means of a locking screw, the clip being used to facilitate carrying and use of cameras.

In its simplest form, the hold fast accessory clip includes a base having a generally planar inner surface and a generally planar outer surface separated by a thickness which defines a sidewall for the clip. A bail element is attached to the base sidewall at either of two opposite extents thereof. The opposite extents of the bail element are received in attachment recesses on the base sidewall which allow the bail element to move relative to the base. The bail element is also spaced-apart from the base along a length thereof, to present a strap attachment opening for the accessory clip. A threaded shaft extends generally vertically outward from the planar inner surface of the base. The threaded shaft has a thru bore provided therein which transverses the threaded shaft at a generally right angle thereto, the thru bore being filled with a resilient plastic material which protrudes slightly at either of two opposite ends of the thru bore. When the threaded bore is received within a mating threaded bore of an associated receptacle, the protruding plastic material molds to the shape of the mating threads and prevents the threads from inadvertently becoming unscrewed and separated.

A particularly preferred version of the accessory clip of the invention is its use as a camera hold fast accessory clip of the type used to provide an attachment point for an associated camera carrying strap. In it most preferred form, the accessory clip has a cylindrical base having a generally planar inner surface and a generally planar outer surface separated by a thickness which defines a circumferential sidewall for the clip. A bail element is attached to the cylindrical base sidewall at either of two opposite bail extents thereof, the bail opposite extents being received in attachment recesses on the cylindrical base which allow the bail element to pivot relative to the cylindrical base. The bail element is also spaced-apart from the cylindrical base along a length thereof, to present a carrying strap attachment opening for the accessory clip. A threaded shaft extends generally vertically outward from the planar inner surface of the cylindrical base, the threaded shaft being selectively sized to be received in a mating threaded camera tripod receptacle provided on the base of a camera to be carried by the carrying strap. The threaded shaft has a length defined between an inner extent and an outer extent. A thru bore which transverses the threaded shaft at a generally right angle thereto, the thru bore being filled with a resilient plastic material which protrudes slightly at either of two opposite ends of the thru bore. The resilient plastic material can be, for example, extruded natural nylon. As has been explained, when the threaded bore is received within a mating threaded bore of an associated receptacle, the protruding resilient plastic material molds to the shape of the mating threads and prevents the threads from inadvertently becoming unscrewed and separated.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
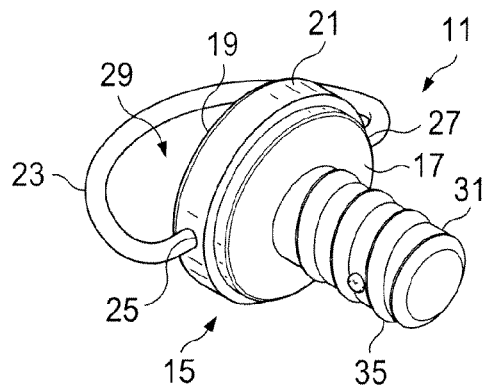
FIG. 1 is perspective view of the camera hold fast accessory clip of the invention.
Figure 3:
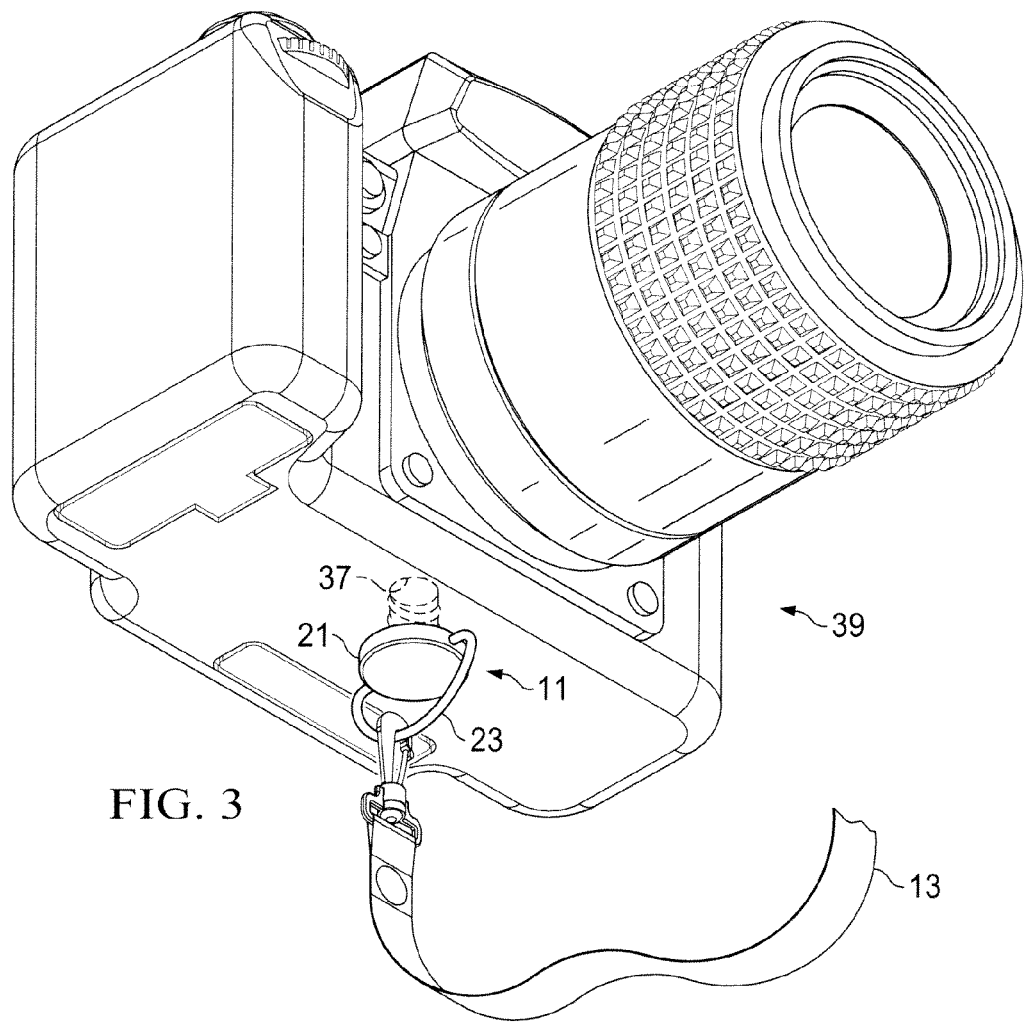
FIG. 3 shows the camera hold fast accessory clip in place on a typical camera, the accessory clip threads being received in a mating camera tripod receptacle on the camera base.

Turning to FIG. 1, there is shown a hold fast accessory clip of the invention, designated generally as 11. The accessory clip 11 can be used to provide an attachment point for an associated strap, such as the strap 13, shown partly broken away in FIG. 3. As will be apparent from FIG. 1, the accessory clip of the invention has a base 15 having a generally planar inner surface 17 and a generally planar outer surface 19. Preferably, the base is cylindrically shaped and the planar surfaces 17, 19 are separated by a thickness which defines a cylindrical sidewall 21 for the clip.

A bail element 23 is attached to the base sidewall at either of two opposite extents 25, 27, thereof. The opposite extents are received in attachment recesses on the base sidewall 21 which allow the bail element 23 to move relative to the base 15. As will also be apparent from FIG. 1, the bail element is spaced-apart from the base along a length thereof, to present a strap attachment opening (generally at 29 in FIG. 1) for the accessory clip.

Figure 2:
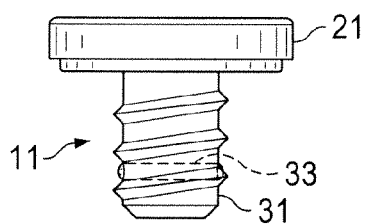
FIG. 2 is a side view of the camera hold fast clip of FIG. 1.

A threaded shaft 31 extends generally vertically outward from the planar inner surface 17 of the base. As can best be seen in FIG. 2, the threaded shaft has a thru bore 33 provided therein which transverses the threaded shaft at a generally right angle thereto. The thru bore being filled with a resilient plastic material which protrudes slightly at either of two opposite ends of the thru bore 33 (best seen in FIG. 1).

The resilient plastic material can be any convenient plastic-like material which has the tensile strength to be retained securely in the thru bore after placement and which is resilient enough to be "molded" between the mating threads 35 of the accessory clip threaded shaft 31 and the mating threads provided in a receptacle opening of an object to be carried. This could be, for example, the threaded bore 37 which makes up the camera tripod receptacle opening provided in the base of the camera 39. Suitable materials include, for example, the nylons, vinyl plastics, natural and synthetic rubbers, and the like.

One preferred material is a polyamide, commonly called nylon. This plastic is described in the literature as being a semi-crystalline, thermoplastic which is comprised of linear aliphatic segments that are connected by amide linkages. Polyamide can be produced either by the polymerization of a lactam and an amino acid, or a dibasic acid and a diamine. These types of plastics can be conveniently used for the present purpose because they are relatively inexpensive and have excellent tensile strength. Unfilled polyamide is biologically inert, and most grades have been cleared for food contact use by the FDA. Nylons are resistant to many chemicals, including ketones, fully halogenated hydrocarbons, ester, fuels and the like. These relatively "inert" properties make them well suited for the particular application at hand.

As will be appreciated from the drawings the resilient plastic material is injected into the thru bore 33 with the resilient plastic material extending outwardly from the thru bore of the accessory clip prior to engaging the accessory clip in a mating threaded receptacle. The exposed resilient plastic material physically "molds" to the shape of mating threads provided in the mating threaded camera tripod receptacle when the accessory is screwed in place, thereby securely locking the accessory clip to the camera tripod receptacle, as show in FIG. 3. It will also be appreciated that the resilient plastic material which is injected into the thru bore 33 is to be distinguished from the use of such materials as Loctite® threaded locker material available from Henkel Corporation. This type of product is an adhesive which cures when confined in the absence of air between close fitting metal surfaces, including threaded surfaces. While such a material might allow separation of joined surfaces with a hand tool, it would be inconvenient in the present application and might even damage the camera threads.

An invention has been provided with several advantages. The hold fast accessory clip of the invention is simple in design and inexpensive to manufacture. It can be used to securely fasten and retain an accessory strap, or the like, to a consumer item to be carried about, such as a camera. The accessory clip can be easily removed, by simply unscrewing the accessory clip when it is no longer needed. Hand tools are not required for disassembly. The accessory clip securely hold a camera strap, and an associated camera or cameras, in place in use, preventing these expensive items from being dropped or lost.

What is claimed is:

1. A camera hold fast accessory clip used to provide an attachment point for an associated camera carrying strap, the accessory clip comprising:
    a cylindrical base having a generally planar inner surface and a generally planar outer surface separated by a thickness which defines a circumferential sidewall for the clip;
    a bail element attached to the cylindrical base sidewall at either of two opposite bail extents thereof, the bail opposite extents being received in attachment recesses on the cylindrical base which allow the bail element to pivot relative to the cylindrical base, the bail element being spaced-apart from the cylindrical base along a length thereof, to present a carrying strap attachment opening for the accessory clip;
    a threaded shaft extending generally vertically outward from the planar inner surface of the cylindrical base, the threaded shaft being selectively sized to be received in an existing mating threaded camera tripod receptacle opening provided on the base of a camera to be carried by the carrying strap, whereby the threaded shaft can be engaged within the existing mating threaded camera tripod receptacle opening by turning and engaging the respective mating threads;
    wherein the threaded shaft has a length defined between an inner extent and an outer extent, the threaded shaft having a thru bore which transverses the threaded shaft at a generally right angle thereto, the thru bore being filled with a resilient plastic material which protrudes slightly at either of two opposite ends of the thru bore, the presence of the protruding resilient plastic material serving to restrict inadvertent unscrewing of the threaded shaft relative to the existing mating threaded camera tripod receptacle opening.

2. The hold fast accessory clip of claim 1, wherein the resilient plastic material is an extruded natural nylon.

3. The hold fast accessory clip of claim 1, wherein the resilient plastic material is a vinyl plastic.

4. The hold fast accessory clip of claim 1, wherein the resilient plastic material is a natural or synthetic rubber.

5. The camera hold fast accessory clip of claim 1, wherein the resilient plastic material which extends outwardly from the thru bore of the accessory clip molds to the shape of mating threads provided in the mating threaded camera tripod receptacle opening when the accessory is screwed in place, thereby securely locking the accessory clip to the camera tripod receptacle opening.

6. In combination, a camera and a camera hold fast accessory clip used to provide an attachment point for an associated camera carrying strap, the combination comprising:

a camera having an upper surface and a lower surface, the lower surface having an existing camera tripod receptacle opening formed therein;

an accessory clip having a cylindrical base having a generally planar inner surface and a generally planar outer surface separated by a thickness which defines a circumferential sidewall for the clip;

the accessory clip having a bail element attached to the cylindrical base sidewall at either of two opposite bail extents thereof, the bail opposite extents being received in attachment recesses on the cylindrical base which allow the bail element to pivot relative to the cylindrical base, the bail element being spaced-apart from the cylindrical base along a length thereof, to present a carrying strap attachment opening for the accessory clip;

wherein the accessory clip also has a threaded shaft extending generally vertically outward from the planar inner surface of the cylindrical base, the threaded shaft being received in the existing mating threaded camera tripod receptacle opening provided on the lower surface of the camera to be carried by the carrying strap by turning and engaging the respective mating threads;

wherein the threaded shaft also has a length defined between an inner extent and an outer extent, the threaded shaft having a thru bore which transverses the threaded shaft at a generally right angle thereto, the thru bore being filled with a resilient plastic material which protrudes slightly at either of two opposite ends of the thru bore, the presence of the protruding resilient plastic material serving to restrict inadvertent unscrewing of the threaded shaft relative to the existing mating threaded camera tripod receptacle.

* * * * *